United States Patent [19]

Miyamoto et al.

[11] Patent Number: 4,645,307
[45] Date of Patent: Feb. 24, 1987

[54] ELECTROCHROMIC DEVICE

[75] Inventors: Takeshi Miyamoto, Yokosuka; Mikio Ura, Yokohama; Shigenori Kazama; Takao Kase, both of Yokosuka; Yoshiko Maeda, Yokohama, all of Japan

[73] Assignee: Nissan Motor Co., Ltd., Yokohama, Japan

[21] Appl. No.: 662,563

[22] Filed: Oct. 19, 1984

[30] Foreign Application Priority Data

Oct. 20, 1983 [JP] Japan .................. 58-195176

[51] Int. Cl.$^4$ .................................. G02F 1/01
[52] U.S. Cl. .......................................... 350/357
[58] Field of Search ........................... 350/357

[56] References Cited

U.S. PATENT DOCUMENTS

| | | | |
|---|---|---|---|
| 4,348,077 | 9/1982 | Kondo et al. | 350/357 |
| 4,498,739 | 2/1985 | Itaya et al. | 350/357 |
| 4,562,056 | 12/1985 | Hottori et al. | 252/25 |

FOREIGN PATENT DOCUMENTS

| | | |
|---|---|---|
| 0068635 | 1/1983 | European Pat. Off. |
| 3048985 | 9/1981 | Fed. Rep. of Germany |
| 3011506 | 10/1981 | Fed. Rep. of Germany |
| 157218 | 9/1982 | Japan .................. 350/357 |
| 157219 | 9/1982 | Japan .................. 350/357 |

OTHER PUBLICATIONS

Itaya et al, "Prussian-Blue-Modified Electrodes: An Application for a Stable Electrochromic Display Device", J. App. Phys., 1-1982, pp. 804-806.

Primary Examiner—William H. Punter
Attorney, Agent, or Firm—Schwartz, Jeffery, Schwaab, Mack, Blumenthal & Evans

[57] ABSTRACT

An electrochromic device having two electrochromic layers respectively formed on oppositely arranged two electrodes and containing an electrolyte such as a solution of an alkali metal salt in an organic solvent which fills up the gap between the two electrodes. The electrochromic layers are formed of an electrochromic material which can alternately and stably exist in three different oxidation states and assumes three different colors in its respective oxidation states such that there is a clear contrast between the color of this material in its normal or intermediate oxidation state and a composite color given by superposition of the color in the highest oxidation state on the color in the lowest oxidation state. Prussian blue is a preferred example of such an electrochromic material, on condition that an adequate amount of water be present in the electrolyte solution or, alternatively, that the Prussian blue layers be pretreated to substitute alkali metal cation for $Fe^{3+}$ interstitially existing in the crystal lattice of Prussian blue.

8 Claims, 12 Drawing Figures

ELECTROCHROMIC DEVICE

BACKGROUND OF THE INVENTION

This invention relates to an electrochromic device using an electrochromic material which can alternately and stably exist in three different oxidation states and assumes different colors in the respective oxidation states. A typical example of the electrochromic material is Prussian blue.

In one type of conventional electrochromic display devices, a solid inorganic oxide film deposited on a transparent electrode serves as an electrochromic material. In the case of widely used tungsten trioxide, the electrochromic oxide film is colorless in its normal state and assumes a blue color when a negative potential is applied to the electrode in contact with the oxide film.

Studies have been continued on a number of organic and inorganic materials that exhibit electrochromic effects to seek out ones which are practical in electrochromic display devices and advantageous in some points, e.g. in the type of color change, in the ease of forming into a film and/or in the stability in the presence of an electrolyte. For example, Prussian blue has attracted interest mainly because it can easily be formed as a film by an electrodeposition process and, therefore, would be favorable for the manufacture of relatively large-sized electrochromic display devices. Prussian blue loses its characteristic blue color when electrochemically reduced to such an extent that the trivalent iron in its crystal lattice entirely turns into divalent iron. Besides, the blue color changes into light yellow when the entire iron in the crystal lattice of Prussian blue is oxidized to trivalent iron. However, such oxidation of a Prussian blue film in the presence of an electrolyte causes gradual decomposition of the Prussian blue film. Therefore, it is difficult to practically utilize the blue-to-yellow and reverse changes in the color of Prussian blue.

SUMMARY OF THE INVENTION

It is an object of the present invention to provide a novel electrochromic device such as a display device, which has advantages in the manner of color change and is favorable for industrial manufacturing.

This invention provides an electrochromic device which comprises a first electrode layer which is transparent, a second electrode layer arranged opposite to and spaced from the first electrode layer, a first electrochromic layer formed on the first electrode layer on the side facing the second electrode layer, a second electrochromic layer formed on the second electrode layer on the side facing the first electrode layer and an electrolyte which fills up the gap between the first and second electrochromic layers, and the primary feature of the invention resides in that the first and second electrochromic layers are both formed of an electrochromic material which undergoes electrochemical oxidation and reduction in two stages and can alternately and stably assume three different oxidation states, the color of the electrochromic material in each oxidation state being different from the colors in the other two oxidation states such that there is a clear contrast between the color in the intermediate oxidation state and a composite color given by superposition of the color in the highest oxidation state on the color in the lowest oxidation state.

To fully utilize the aforementioned contrast between the two colors, the same electrochromic material is used for the first and second electrochromic layers. This electrochromic device normally exhibits the color of the employed electrochromic material in its intermediate oxidation state. By application of a voltage across the two electrodes, the color of the device changes to a composite color given by superposition of the color of one electrochromic layer which is oxidized to the highest oxidation state and the color of the other electrochromic layer which is reduced to the lowest oxidation state. This color change occurs irrespective of the polarity of the applied voltage, and this is an important advantage of the present invention.

Preferred examples of the above defined electrochromic material are Prussian blue and 2,2'-bipyridyl iron complex. When the first and second electrochromic layers are formed of Prussian blue the aforementioned composite color becomes light yellow in contrast with the blue color of Prussian blue in the normal state. When the two electrochromic layers are formed of 2,2'-bipyridyl iron complex which assumes red color in its normal state, the composite color becomes light blue.

In the case of using Prussian blue in this invention, it is important that the electrolyte in the device be a solution of an alkali metal salt which serves as a supporting electrolyte, such as lithium perchlorate, in an organic polar solvent such as propylene carbonate containing 0.8-1.5 wt % of water or, alternatively, that the electrochromic layer(s) of Prussian blue be pretreated such that the $Fe^{3+}$ ion interstitially existing in the crystal lattice of Prussian blue is substituted by alkali metal cation. In the latter case, the electrolyte in the device is a solution of an alkali metal salt in an organic polar solvent which need not contain water. Prussian blue as the preferred electrochromic material in this invention can easily be formed by a known electrodeposition process. Therefore, a relatively large-sized device according to the invention can easily be produced at relatively low cost.

DETAILED DESCRIPTION OF THE INVENTION

Figure 1:
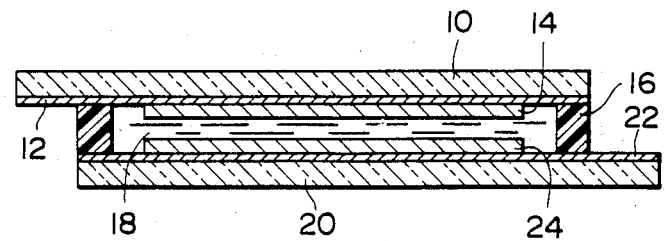
FIG. 1 is a schematic and sectional view of an electrochromic display device according to the invention.

FIG. 1 shows a general construction of an electrochromic display device according to the invention. The device has top and bottom substrates 10 and 20 which are made of a transparent material such as glass plate. A transparent electrode 12 in the form of a film is deposited on the inside surface of the top substrate 10, and a first electrochromic layer 14 is formed on the transparent electrode 12 in a desired pattern. Another transparent electrode 22 in the form of a film is deposited on the inside surface of the bottom substrate 20, and a second electrochromic layer 24 is formed on this electrode 22 in a desired pattern. For example, the material of the two electrodes 12, 14 is tin dioxide or diindium trioxide, and the material of the first and second electrochromic layers 14, 24 is Prussian blue. The two substrates 10 and 20 are held spaced from each other by a sealing resin 16 such that the first and second electrochromic layers 14 and 24 are opposite to and spaced from each other. The space defined by the two substrates 10, 20 and the peripheral seal 16 is filled with a liquid electrolyte 18, which is a solution of an alkali metal salt such as lithium perchlorate in an organic polar solvent such as propylene carbonate.

Figure 2:
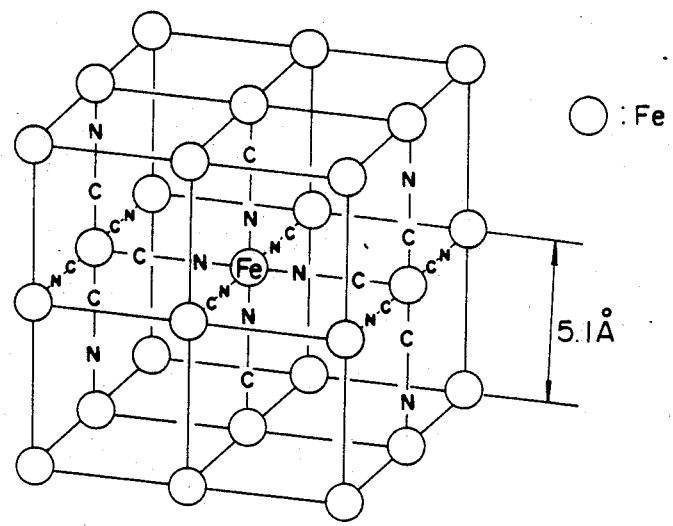
FIG. 2 shows a steric structure of Prussian blue, which is a preferred electrochromic material in the present invention.

Prussian blue, a preferred electrochromic material in the present invention, exists as a three-dimensional complex having a cubic structure as shown in FIG. 2. That is, this complex is a composite valence complex which has a fundamental crystal lattice constructed by bridging Fe(III) and Fe(II) by cyanogen groups and includes $Fe^{3+}$ ions or alkali metal ions such as $Li^+$, $Na^+$, $K^+$ or $Pb^+$ ions as interstitial ions (not shown in FIG. 2). This complex is called insoluble Prussian blue $Fe(III)[Fe(III)Fe(II)(CN)_6]_3$ when the interstitially existing ions are $Fe^{3+}$ ions and soluble Prussian blue $MFe(III)Fe(II)(CN)_6$, where M is Li, Na, K or Pb, when the interstitially existing ions are alkali metal ions. However, the soluble Prussian blue does not actually dissolve in water: it is called "soluble" because it gives a colloidal dispersion without precipitating.

A film of Prussian blue can be formed on an electrode surface by an electrodeposition process using a mixed solution containing $Fe^{3+}$ ions and hexacyanoferrate(III) ions $[Fe(CN)_6]^{3-}$. Electrolysis of the mixed solution results in the deposition of Prussian blue on the surface of the cathode as an electrochemical reduction product in the form of film tightly adhering to the cathode surface.

The following is a description of an experiment on the electrochemical oxidation and reduction reactions of Prussian blue.

Figure 3:
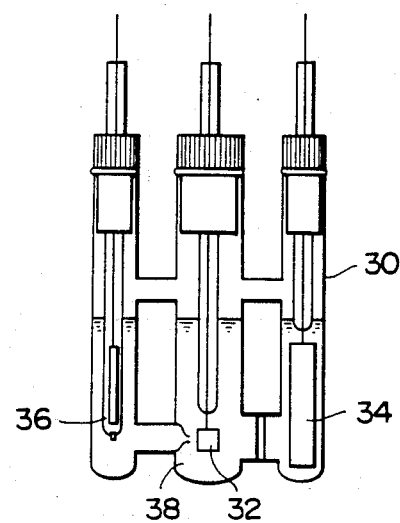
FIG. 3 is a schematic and sectional view of an electrolytic cell used in our experiment on the electrochromic properties of Prussian blue.

FIG. 3 shows an electrolytic cell used in the experiment. An indicator electrode 32 was prepared by coating an indium trioxide electrode having a surface area of 1 $cm^2$ with a film of Prussian blue. The indicator electrode 32, a counter electrode 34 using a platinum plate and a reference electrode 36, which was a saturated calomel electrode (abbreviated to SCE), were disposed in a glass vessel 30 in the illustrated arrangement, and an electrolyte liquid 38 was poured into the vessel 30. In this case the electrolyte liquid 38 was an aqueous solution of potassium chloride (1 N). Nitrogen gas was introduced into the cell to expel air (oxygen) therefrom, and the respective electrodes 32, 34, 36 were connected to a potentiostat (not shown) used as a power supply.

Figure 4:
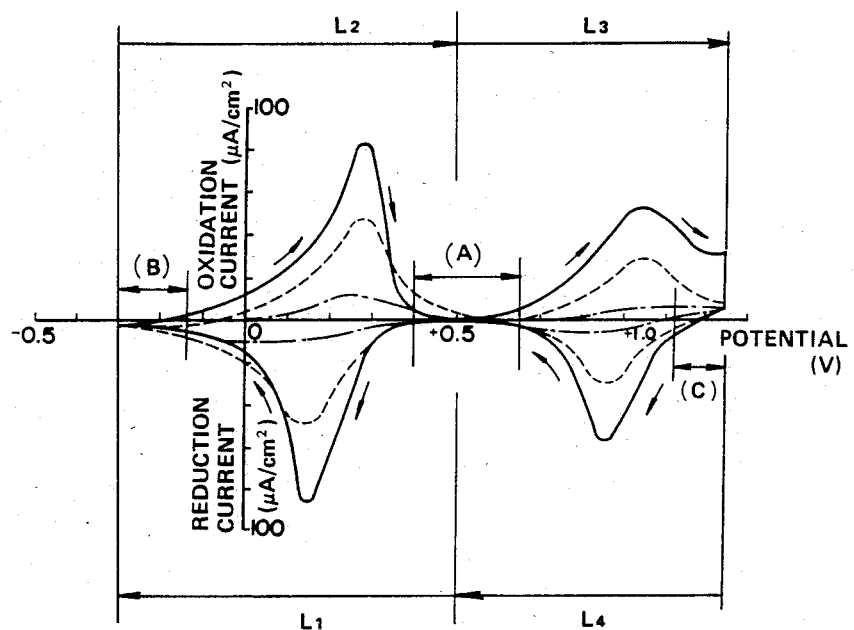
FIG. 4 is a diagram showing a cyclic voltamogram on the indicator electrode coated with a film of Prussian blue in the cell of FIG. 3, the cell using an aqueous solution as the electrolyte.

In this experiment the potential of the indicator electrode 32 on the basis of the potential at the reference electrode 36 was continuously varied at a slow rate of 10 mV/min by application of a low-frequency sawtooth wave voltage while measuring an electrolysis current varying with the indicator electrode potential. At the same time the manner of changes in the surface color of the indicator electrode 32 was observed. FIG. 4 is a cyclic voltamogram showing the relationship between the potential at the indicator electrode 32 (on the basis of the SCE potential) and the electrolysis current found by the experiment. Initially, the potential at the Prussian blue indicator electrode 32 was on the level of about +0.5 V, and the electrode surface assumed blue color.

The externally applied voltage was varied so as to cause the indicator electrode potential (on the basis of the SCE potential) to continuously vary in the directions indicated by arrows in FIG. 4. While the indicator potential was varying toward the positive side a peak of electrolytic oxidation current appeared at a potential of about +0.3 V and another peak at about +0.95 V. While the potential was varying toward the negative side a peak of electrolytic reduction current appeared at a potential of about +0.85 V and another peak at about +0.15 V. The indicator electrode 32 assumed blue color while the indicator electrode potential was in the range (A) in FIG. 4. In the range (B) the indicator electrode 32 was colorless and transparent. In the range (C) the indicator electrode 32 assumed a light yellow color. That is, a change in the color of the indicator electrode 32 from blue to colorless transparence occurred during the process $L_1$ in FIG. 4 and a reverse change during the process $L_2$. Another change in the color of the same electrode 32 from blue to light yellow occurred during the process $L_3$ and a reverse change during the process $L_4$.

The cyclical changes in the indicator electrode potential was repeated many times. In FIG. 4 the curve in solid line represents the voltamogram at the first cycle. When the indicator electrode potential was continuously varied within the range between −0.3 V and +0.5 V to repeat only the processes $L_1$ and $L_2$, it was possible to stably repeat the blue-to-colorless and reverse changes in the color of the indicator electrode 32. However, when the indicator electrode potential was continuously varied over the range between −0.3 V and +1.15 V to repeat not only the processes $L_1$ and $L_2$ but also the processes $L_3$ and $L_4$, the electrolytic oxidation and reduction currents decreased gradually. At the tenth and twentieth cycles, the current peaks reduced as represented by the curve in dotted line and by the curve in chain line, respectively. This is because an oxide of Prussian blue which exists in the range (C) of FIG. 4 is chemically unstable in an aqueous solution and, hence, undergoes gradual decomposition to result in a gradual decrease in the thickness of the Prussian blue film of the indicator electrode 32.

Figure 5:
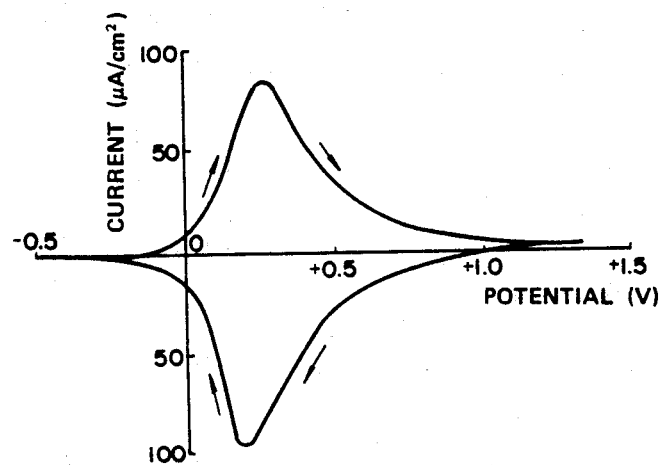
FIG. 5 is a diagram showing a cyclic voltamogram on the same indicator electrode observed when a solution of a sodium salt in propylene carbonate was used as the electrolyte.

In a comparative experiment in which propylene carbonate was used as the solvent for the electrolyte liquid in place of water used in the above described experiment, the potential-current relationship became as represented by the cyclic voltamogram of FIG. 5. In this case, no oxidation current peak appeared when the indicator electrode potential was varied from the normal level toward the positive side, and the aforementioned blue-to-yellow change in the indicator electrode color did not occur. By extensive experimental studies it was confirmed that Prussian blue hardly undergoes such an electrolytic oxidation reaction as causes a color change from blue to yellow.

For the above explained reasons it was impracticable to utilize the reversible blue-to-yellow change in the color of Prussian blue in electrochromic devices.

We were interested in the behavior of Prussian blue in an electrolyte liquid which uses an organic solvent and contains some water and conducted further experimental studies. The following is a description of an example of such experiments.

As the reference, the experiment described hereinbefore with reference to FIGS. 3 and 4 was repeated almost identically except that a solution of sodium perchlorate in propylene carbonate (concentration 1 mole/liter) was used as the electrolyte liquid 38. Since commercial propylene carbonate contains various impurities such as water, propylene glycol, allyl alcohol, 1,2-propanediol and/or propylene oxide, refinement of propylene carbonate was carried out in advance by passing it through a column of active alumina and then distilling it twice. By the Karl Fischer technique the content of water in the electrolyte liquid was measured to be 0.1% by weight. In this case the cyclic voltamogram was as shown in FIG. 5. As can be seen in FIG. 5, no peak of oxidation current appeared even though the indicator electrode potential (on the basis of the SCE potential) was gradually varied toward the positive side to the extent of about +1.3 V. In this case the indicator electrode assumed the blue color even at the potential of +1.3 V, and no change occurred in the shape of the potential-current curve when the cyclic change in the potential was repeated twenty times.

Figure 6:
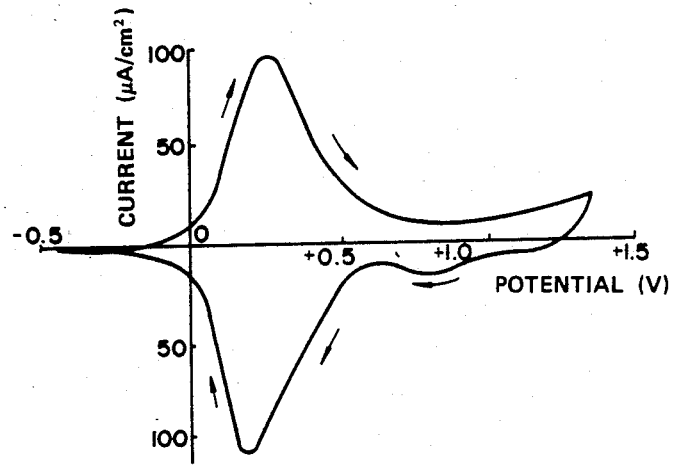
FIGS. 6 to 11 show variations of the voltamogram of FIG. 5 observed when water was added to the electrolyte in gradually increasing amounts.
Figure 7:
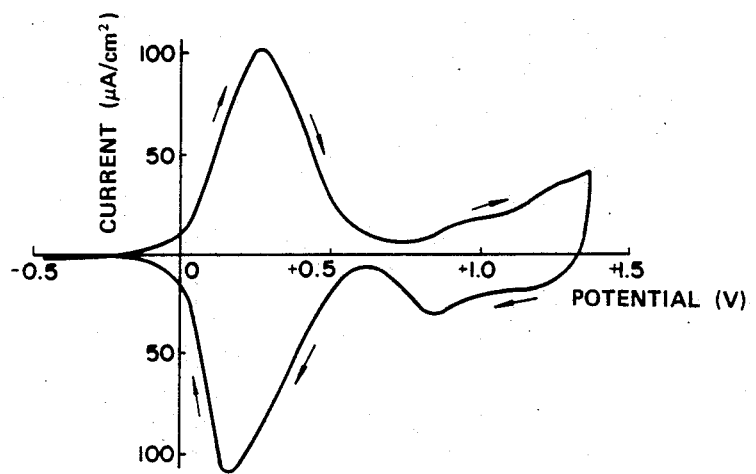
Figure 8:
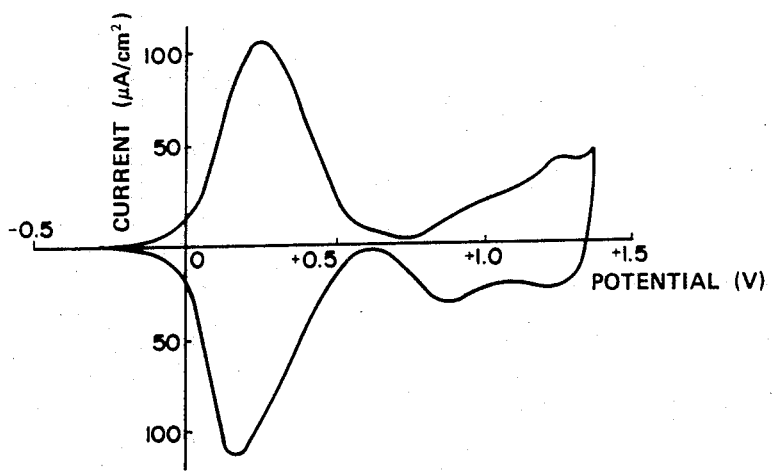
Figure 9:
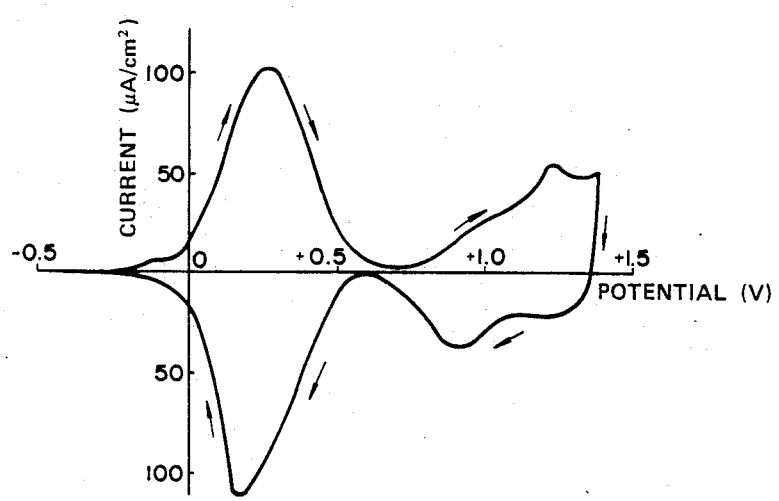
Figure 10:
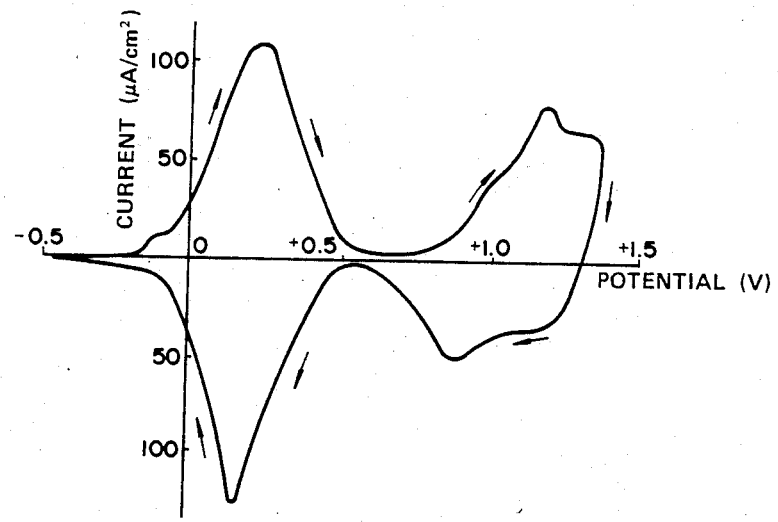

In the experiment water was added to the aforementioned sodium perchlorate solution in propylene carbonate in variable amounts. When the content of water in the electrolyte liquid was 0.4 wt %, the voltamogram at the first cycle of the potential change was as shown in FIG. 6. As the content of water was increased to 0.6 wt %, to 0.8 wt %, to 1.8 wt % and to 4.6 wt %, the voltamogram at the first cycle of the potential change varied to the ones shown in FIGS. 7, 8, 9 and 10, respectively. As can be seen in FIGS. 6–10, an oxidation current at the indicator electrode potential of about +1.3 V gradually increased as the water content in the electrolyte liquid increased.

In the electrolyte liquid containing 4.6 wt % of water, the cyclic change in the indicator electrode potential was repeated tens of times. During the continued measurement the shape of the potential-current curve varied little by little from the shape shown in FIG. 10 to the shape shown in FIG. 11. After that, however, the shape of the curve scarcely varied even though the cyclic change in the potential was repeated thousands of times, and it was possible to stably repeat the changes in the color of the Prussian blue indicator electrode between the colorless transparency at potentials near to −0.3 V, blue color at potentials near to +0.5 V and the light and transparent yellow color at potentials near to +1.3 V. The stable voltamogram of FIG. 11 was obtained also when the indicator electrode subjected to tens of cycles of the potential change was tested in the electrolyte liquid containing 0.8 wt % or 1.8 wt % of water.

Figure 11:
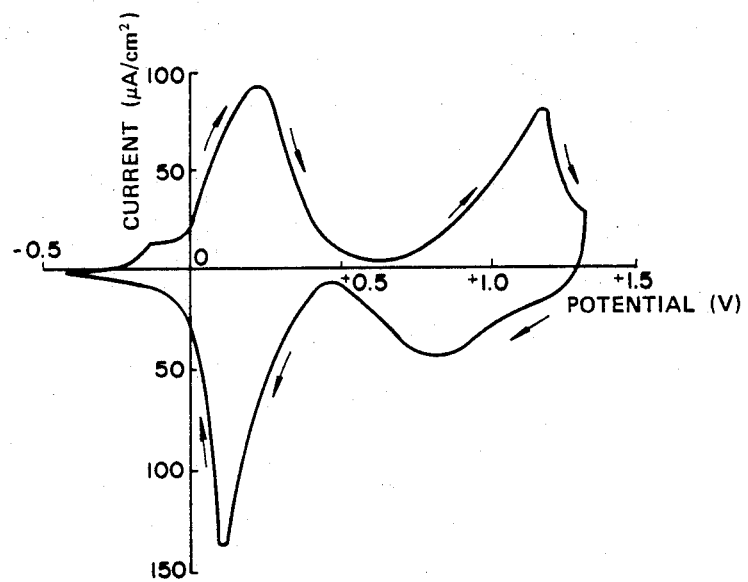

The experiment was extended by increasing the content of water in the solution of sodium perchlorate in propylene carbonate. The result of the measurement was still as shown in FIG. 11 until the water content reached about 15 wt %. When the water content exceeded 15 wt %, gradual decomposition of the Prussian blue in the oxidized state took place in the same manner as in the case of using a purely aqueous solution as the electrolyte liquid.

From the above experimental results, it is presumable that, despite the fact that Prussian blue in the oxidized state is chemically unstable in an aqueous solution, water present in an electrolyte liquid using an organic solvent plays a certain role in promoting the electrochemical oxidation reaction of the electrodeposited Prussian blue film. However, the true mechanism of the participation of water in the oxidation reaction is not elucidated.

The past studies have shown that a Prussian blue film formed by electrodeposition from an aqueous solution containing $Fe^{3+}$ ions and hexacyanoferrate(III) ions would probably be the so-called insoluble Prussian blue $Fe(III)[Fe(III)Fe(II)(CN)_6]_3$. For electrochemical oxidation of the insoluble Prussian blue, it is necessary that the anions in the electrolyte be injected into the crystal lattice of Prussian blue or $Fe^{3+}$ ions that interstitially exist in the crystal lattice be expelled from the crystal lattice. However, considering the ion radius of $ClO_4^-$ which was the anion in the electrolyte used in the above described experiments, it seems to be improbable that $ClO_4^-$ intrudes into an about 3.2 Å diameter channel of the cubic unit lattice having a lattice constant of 5.1 Å. Therefore, it is presumable that the degree of liability of the interstitially existing $Fe^{3+}$ ions to be expelled from the crystal lattice affects the liability of the electrodeposited Prussian blue film to undergo electrochemical oxidation reaction. In other words, it is presumable that the expulsion of the interstitial $Fe^{3+}$ ions from the crystal lattice is unlikely in an organic solvent but becomes easily occurrent when water exists in the solvent. Assuming that electrochemical oxidation of Prussian blue takes place since the presence of water in the electrolyte facilitates expulsion of the interstitial $Fe^{3+}$ ions from the crystal lattice, cations ought to be injected into the crystal lattice at the time of reducing the once oxidized Prussian blue to its normal state assuming the blue color. In the electrolyte liquid the cation of the supporting electrolyte, e.g. $Na^+$ in the above described experiments, in an overwhelmingly larger quantity than the $Fe^{3+}$ expelled from the Prussian blue crystal lattice. Accordingly it is highly probable that the alkali metal ions are injected into the Prussian blue crystal lattice. After such substitution of the alkali metal ions for the interstitial $Fe^{3+}$ ions in the crystal lattice, the expulsion of the interstitial cations (alkali metal ions) from the crystal lattice as a requisite to the electrochemical oxidation of Prussian blue will become easy, and this will be the reason for the experimentally confirmed fact that the blue-to-yellow change and the reverse change in the color of the Prussian blue film can be realized stably and repeatedly.

Figure 12:
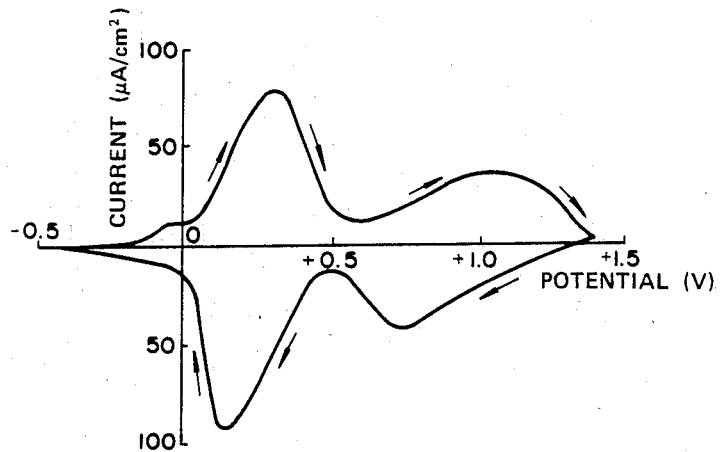
FIG. 12 shows a variation of the cyclic voltamogram of FIG. 5 observed when the indicator electrode was subjected to electrochemical oxidation and reduction in a water-containing electrolyte before testing in the non-aqueous electrolyte.

The above presumption is supported by experimental results. The Prussian blue electrode 32 on which the voltamogram of FIG. 11 was obtained after repeating the potential change tens of times in the sodium perchlorate solution in propylene carbonate containing 4.6 wt % of water was used in an additional experiment. That is, the water-containing electrolyte solution was replaced by the 1 N sodium perchlorate solution in the refined propylene carbonate, and the indicator electrode potential was continuously varied in the manner as shown in FIG. 5. In this case the voltamogram was as shown in FIG. 12. Unlike the voltamogram of FIG. 5, a peak of electrolytic oxidation current appeared at the potential of about +1.0 V, and at this stage the color of the indicator electrode changed from blue to yellow. When the potential was varied in the reverse direction a peak of reduction current appeared at about +0.75 V, and the yellow color of the indicator electrode reverted to blue.

In a separate experiment, an aqueous solution of potassium chloride was first used as the electrolyte liquid 38 in the experimental cell of FIG. 3, and the indicator electrode potential was continuously and cyclically varied over the range from +0.5 V to −0.4 V wherein Prussian blue is chemically stable. The potential change was repeated twenty times. After that the same indicator electrode was tested in 1 N solution of sodium perchlorate in refined propylene carbonate without adding water thereto. Also in this case the voltamogram was as shown in FIG. 12.

The results of these experiments indicate that the cyclic change of the Prussian blue electrode potential in either an aqueous electrolyte solution or an organic electrolyte solution containing water produces a difference in the structure of the Prussian blue film itself compared with the structure of the same film subjected to the potential change in an electrolyte solution practically free of water. The different structure is presumed to be attributed to the substitution of the alkali metal cations ($M^+$) in the water-containing solution for the interstitial $Fe^{3+}$ ions in the crystal lattice of Prussian blue as represented by either of the following equations (1) and (2).

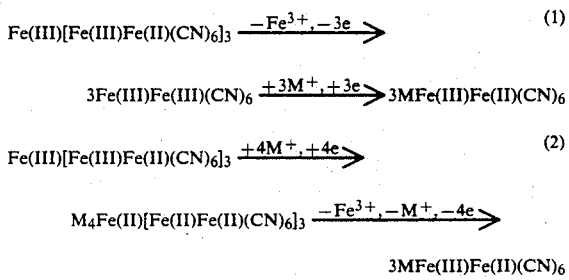

After such substitution of the alkali metal cation for the interstitial cation, the Prussian blue film undergoes electrochemical oxidation and reduction reactions in two stages even in an electrolyte liquid prepared by dissolving an inorganic supporting electrolyte in an organic polar solvent without adding water thereto:

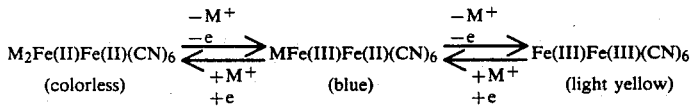

By using these reactions it is possible to stably repeat the two-stage changes in the color of the indicator electrode between colorless transparency, blue color and light yellow color in both directions.

As will be understood from the foregoing description, when Prussian blue is used as the electrochromic material in the present invention it is necessary to use an electrolyte liquid which is prepared by dissolving a supporting electrolyte of which the cation is alkali metal ion in an organic polar solvent containing 0.8-15 wt % of water, or alternatively to subject the electrodeposited Prussian blue film to a pretreatment that renders Prussian blue liable to undergo electrochemical oxidation with resultant change in the color from blue to light yellow.

According to the invention, such a pretreatment can be accomplished by subjecting the electrodeposited Prussian blue film to electrochemical oxidation and reduction reactions in an electrolyte liquid prepared by dissolving a supporting electrolyte of which the cation is alkali metal ion in either water or an organic solvent containing at least 15 wt % of water until the Prussian blue film undergoes at least one cycle of the blue-to-colorless and reverse changes in color, while limiting the potential at the Prussian blue electrode within a range wherein the Prussian blue film does not decompose. Alternatively, a pretreatment of the same effect can be accomplished by subjecting the Prussian blue film to electrochemical oxidation and reduction reactions in an electrolyte liquid prepared by dissolving a supporting electrolyte of which the cation is alkali metal ion in an organic polar solvent containing 0.8-15 wt % of water until the Prussian blue film undergoes at least one cycle of the blue-to-colorless and reverse changes and/or at least one cycle of the blue-to-yellow and reverse changes in color, while limiting the potential at the Prussian blue electrode within a range wherein the Prussian blue film does not decompose.

The electrochromic material in the present invention is not limited to Prussian blue. There are some other materials which also undergo electrochemical oxidation and reduction in two stages stably and repeatedly and can alternately assume three different oxidation states with such changes in color that there is a clear contrast between the color in the intermediate oxidation state and a composite color given by superposition of the color in the highest oxidation state on the color in the lowest oxidation state, and such materials are of use as the material of the first and second electrochromic layers 14 and 24 in the device of FIG. 1. For example, 2,2′-bipyridyl iron complex is fully practicable.

As to the organic solvent in the electrolyte liquid, it is preferable to select a solvent which is highly polar, can dissolve popular supporting electrolytes in high concentrations and does not undergo electrochemical oxidation or reduction within the potential range utilized in the electrochromic device. Propylene carbonate and acetonitrile are named as preferred examples.

The invention will further be illustrated by the following examples.

EXAMPLE 1

An electrochromic display device of the construction shown in FIG. 1 was produced in the following way.

A transparent glass plate was used as the material of the top and bottom substrates 10 and 20, and the transparent electrodes 12 and 22 were formed respectively on the two substrates 10 and 20 by vacuum deposition of tin dioxide. Prussian blue was electrodeposited on the first electrode 12 to a thickness of 2000 Å to thereby form the first electrochromic layer 14, and also on the second electrode 22 to the same thickness to thereby form the second electrochromic layer 24.

Each of the thus processed substrates 10 and 20 was immersed in 1 mole/liter solution of potassium chloride in water in combination with a counter electrode formed of platinum plate and a saturated calomel reference electrode, and a variable voltage was applied to the electrode 12 or 22 covered with Prussian blue 14, 24 so as to continuously vary the potential at this electrode 12 or 22 over the range from −0.4 V to +0.5 V on the basis of the SCE potential. In this manner the pretreatment of the Prussian blue layers 14, 24 was accomplished.

After that the two substrates 10 and 20 were arranged opposite to each other and assembled into a blank cell by application of an epoxy sealant 16 therebetween so as to surround the electrochromic layers 14, 24. By an opening (not shown) left in the peripheral seal 16, 1 mole/liter solution of lithium perchlorate in propylene carbonate was introduced into the cell as the electrolyte liquid 18, and the aforementioned opening was completely sealed to thereby complete the electrochromic device.

Initially both the first and second Prussian blue layers 14 and 24 in the thus produced device assumed blue color. When a voltage of 1.2–1.4 V was applied across the two electrodes 12 and 22, the Prussian blue layer on the negative side was electrochemically reduced to the lowest oxidation state and became colorless and transparent, whereas the Prussian blue layer on the positive side was oxidized to the highest oxidation state and assumed a light yellow color. Accordingly the color of the entire device or the composite color of the two Purssian blue layers 14, 24 changed from the initial blue color of about 10% transmittance to a light yellow color of about 60% transmittance. When the two electrodes were short-circuited, both the first and second Prussian blue layers 14 and 24 again assumed the blue color. By continuously and cyclically varying the potential at each electrode over the range from +1.3 V to −0.4 V on the basis of the SCE potential, it was confirmed that the changes in color were stably repeatable.

In this device the first and second electrochromic layers 14 and 24 are formed of the same Prussian blue. In principle, therefore, there is no need of paying attention to the polarity of voltage applied to the device to effect bleaching. In practice, however, it is favorable to alternate the polarity of that voltage in repeating bleaching many times because the life of the device can be prolonged by doing so.

EXAMPLE 2

The device of FIG. 1 was produced generally in accordance with Example 1 except that the pretreatment of the Prussian blue layers in the aqueous solution was omitted and that 1 mole/liter solution of sodium perchlorate in acetonitrile containing 5.0 wt % of water was used as the electrolyte liquid 18. By continuously and cyclically varying a voltage applied across the two electrodes over the range from 0 V to +1.4 V, it was possible to stably repeat the blue-to-light yellow and reverse color changes.

As minor modifications, the solvent of the electrolyte was changed to propylene carbonate containing 5 wt % of water, and the supporting electrolyte was changed to lithium perchlorate in one case and to potassium borofluoride in the other case. In every case the electrochromic function of the device was unchanged.

EXAMPLE 3

In producing the device of FIG. 1, 2,2'-bipyridyl iron complex was used as the material of the first and second electrochromic layers 14 and 24, and 1 mole/liter solution of sodium perchlorate in propylene carbonate was used as the electrolyte liquid 18. Otherwise the manufacturing process was as described in Example 2.

Initially the 2,2'-bipyridyl iron complex layers 14 and 24 in this device assumed a red color. When a voltage of 2.5 V was applied across the two electrodes, one of the two electrochromic layers 14, 24 was electrochemically reduced to assume a blue color whereas the other was oxidized to assume a white color. Accordingly the color of the entire device became light blue as a composite color of the respectively reduced and oxidized 2,2'-bipyridyl iron complex layers 14 and 24.

It should be noted that in the device of FIG. 1 the bottom substrate 20 and the second electrode 22 need not be transparent.

In the case of using Prussian blue, the intermediate green color can also be utilized. By open-circuiting the device while the device is assuming green color in the course of the color change from blue to light yellow or reversely, it is possible to keep the green color unchanged. Accordingly, it is possible to produce a multicolor electrochromic device which can alternately assume blue, green and light yellow colors.

What is claimed is:

1. An electrochromic device comprising:
   a first electrode layer which is transparent;
   a second electrode layer arranged opposite to and spaced from said first electrode layer;
   first and second electrochromic layers formed respectively on said first and second electrode layers, said electrochromic layers comprising an electrochromic material which is Prussian blue, said electrochromic layers facing each other and undergoing electrochemical oxidation and reduction in two stages and alternately and stably assuming three different oxidation states, the color of each said electrochromic layer in each oxidation state being different from the colors in the other two oxidation states such that there is a clear contrast between the color in the intermediate oxidation state and a composite color given by superposition of the color of one said electrochromic layer in the highest oxidation state on the color of the other said electrochromic layer in the lowest oxidation state; and
   an electrolyte which fills up the gap between said first and second electrochromic layers, said electrolyte being a solution of a supporting electrolyte of which the cation is alkali metal ion in an orcanic polar solvent comprising propylene carbonate or acetonitrile and containing from about 0.8 to about 15 wt % of water.

2. An electrochromic device according to claim 1, wherein said supporting electrolyte is selected from the group consisting of lithium perchlorate, sodium perchlorate and potassium borofluoride.

3. An electrochromic device produced by a process comprising the steps of:
   (a) forming a separate transparent electrode layer on each two transparent plates, one of said plates forming a bottom substrate and the other of said plates forming a top substrate;
   (b) electrodepositing a layer of electrochromic material on each of said transparent electrode layers;

(c) separately immersing each of said substrates in an aqueous solution containing alkali metal ions, a counter electrode and a reference electrode:

(d) applying a variable voltage to said transparent electrode on each of said immersed substrates and continuously varying the potential at said transparent electrode over a range sufficient to effect ion exchange between said electrochromic material in said immersed substrate and said aqueous solution;

(e) removing said substrates from said aqueous solution and arranging them in a manner such that said layers of electrochromic material face each other;

(f) assembling said substrates into a blank cell by applying a sealant therebetween so as to form a peripheral seal around said layers of electrochromic material, said peripheral seal including an opening;

(g) introducing an organic electrolyte into said cell through said opening; and (h) sealing said opening.

4. An electrochromic device according to claim 3, wherein said electrochromic material comprises Prussian blue or 2,2'-bipyridyl iron complex.

5. An electrochromic device according to claim 3, wherein said alkali metal ions comprise lithium, sodium, potassium, or rubidium ions.

6. An electrochromic device according to claim 3, wherein said aqueous solution is a solution of potassium chloride at a concentration of about one mole per liter.

7. An electrochromic device according to claim 3, wherein said variable voltage applied in step (d) is from about $-0.4$ V to about $+0.5$ V.

8. An electrochromic device according to claim 3, wherein said transparent electrodes are tin dioxide, and said forming step includes vacuum deposition.

* * * * *